United States Patent
Zheng et al.

(10) Patent No.: US 10,691,929 B2
(45) Date of Patent: Jun. 23, 2020

(54) METHOD AND APPARATUS FOR VERIFYING CERTIFICATES AND IDENTITIES

(71) Applicant: Alibaba Group Holding Limited, George Town (KY)

(72) Inventors: Dandan Zheng, Hangzhou (CN); Wei Xu, Hangzhou (CN); Liang Li, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/422,765

(22) Filed: May 24, 2019

(65) Prior Publication Data

US 2019/0278977 A1 Sep. 12, 2019

Related U.S. Application Data

(63) Continuation of application No. PCT/CN2018/099933, filed on Aug. 10, 2018.

(30) Foreign Application Priority Data

Oct. 20, 2017 (CN) .......................... 2017 1 0986508

(51) Int. Cl.
*G06K 9/00* (2006.01)

(52) U.S. Cl.
CPC ..... *G06K 9/00288* (2013.01); *G06K 9/00221* (2013.01); *G06K 9/00255* (2013.01);
(Continued)

(58) Field of Classification Search
CPC ........... G06Q 20/40145; G06Q 50/265; G06Q 20/3415; G06Q 30/0601; H04N 1/32144;
(Continued)

(56) References Cited

U.S. PATENT DOCUMENTS 5,751,854 A    5/1998  Saitoh et al.
8,879,783 B1 * 11/2014  Wang ................. G06K 7/10
                                                        382/100
(Continued)

FOREIGN PATENT DOCUMENTS

CN        103379282 A      10/2013
CN        104869107 A       8/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Guillermo M Rivera-Martinez
(74) *Attorney, Agent, or Firm* — Fish & Richardson P.C.

(57) ABSTRACT

This specification describes techniques for verifying authenticity of an image. One example method includes identifying a baseline image depicting a baseline background; identifying a comparison image depicting a card; identifying a comparison background in the comparison image, wherein the comparison background is an area of the comparison image other than an area occupied by the card; determining a probability that the baseline background matches the comparison background; determining that the probability satisfies a verification threshold; and in response to determining that the probability satisfies a verification threshold, determining that the comparison image was acquired by capturing an image of a physical card corresponding to the card depicted in the comparison image.

20 Claims, 7 Drawing Sheets

(52) U.S. Cl.
CPC ..... *G06K 9/00268* (2013.01); *G06K 9/00483* (2013.01); *G06K 9/00664* (2013.01)

(58) Field of Classification Search
CPC ....... H04N 1/00005; H04N 2201/3233; H04N 1/32352; H04N 21/23892; H04N 21/8358; G06K 9/00442; G06K 2009/0059; G06T 1/0021
See application file for complete search history.

(56) References Cited

U.S. PATENT DOCUMENTS

| | | | |
|---|---|---|---|
| 9,147,127 B2 | 9/2015 | Shu | |
| 10,255,595 B2* | 4/2019 | Van Os | G06Q 20/32 |
| 2005/0025338 A1* | 2/2005 | Zhao | G06T 1/0028 |
| | | | 382/100 |
| 2008/0316328 A1* | 12/2008 | Steinberg | G06K 9/036 |
| | | | 348/222.1 |
| 2010/0078471 A1* | 4/2010 | Lin | G06Q 40/02 |
| | | | 235/379 |
| 2012/0106805 A1* | 5/2012 | Shuster | G06K 9/00912 |
| | | | 382/115 |
| 2012/0284185 A1* | 11/2012 | Mettler | G06Q 40/02 |
| | | | 705/44 |
| 2012/0292388 A1* | 11/2012 | Hernandez | G06Q 20/108 |
| | | | 235/379 |
| 2013/0218721 A1* | 8/2013 | Borhan | G06Q 20/322 |
| | | | 705/26.41 |
| 2014/0052636 A1* | 2/2014 | Mattes | G06Q 20/409 |
| | | | 705/44 |
| 2015/0006360 A1* | 1/2015 | Kumar | G06Q 20/34 |
| | | | 705/39 |
| 2015/0227922 A1* | 8/2015 | Filler | G06Q 20/367 |
| | | | 705/41 |
| 2015/0294304 A1* | 10/2015 | Donnellan | G06Q 20/12 |
| | | | 705/44 |
| 2015/0317529 A1* | 11/2015 | Zhou | G06K 9/2054 |
| | | | 382/190 |
| 2015/0332082 A1 | 11/2015 | King | |
| 2015/0341370 A1* | 11/2015 | Khan | H04L 63/20 |
| | | | 726/30 |
| 2016/0048837 A1* | 2/2016 | Jin | G06O 20/409 |
| | | | 705/76 |
| 2016/0165200 A1* | 6/2016 | Helt | G09G 5/02 |
| | | | 348/182 |
| 2016/0189122 A1* | 6/2016 | Abulafia | G06K 9/2054 |
| | | | 705/40 |
| 2017/0061563 A1 | 3/2017 | Falkenstem et al. | |
| 2017/0180692 A1 | 6/2017 | Sunkavalli et al. | |
| 2017/0344824 A1* | 11/2017 | Martin | G06K 9/00463 |
| 2017/0372322 A1* | 12/2017 | Morey | G06K 9/64 |
| 2018/0012094 A1* | 1/2018 | Wu | G06K 9/00295 |
| 2018/0060874 A1* | 3/2018 | Kelts | H04L 63/126 |
| 2018/0108101 A1* | 4/2018 | Rodriguez | G06K 9/00442 |
| 2018/0260617 A1* | 9/2018 | Jones | G06K 9/00288 |
| 2019/0005672 A1* | 1/2019 | McLear | G06Q 30/0623 |

FOREIGN PATENT DOCUMENTS

| | | |
|---|---|---|
| CN | 105227310 A | 1/2016 |
| CN | 105681316 A | 6/2016 |
| CN | 105989263 A | 10/2016 |
| CN | 106157405 A | 11/2016 |
| CN | 106204048 A | 12/2016 |
| CN | 106709963 A | 5/2017 |
| CN | 106803086 A | 6/2017 |
| CN | 107016608 | 8/2017 |
| CN | 107113614 A | 8/2017 |
| CN | 107832679 A | 3/2018 |
| CN | 107944339 A | 4/2018 |
| EP | 2784723 | 10/2014 |
| RU | 2294784 | 3/2007 |

OTHER PUBLICATIONS

Nakamoto, "Bitcoin: A Peer-to-Peer Electronic Cash System," www.bitcoin.org, 2005, 9 pages.
PCT International Search Report and Written Opinion issued in International Application No. PCT/CN2018/099933 dated Nov. 15, 2018, 10 pages (partial English translation).
European Extended Search Report in European Patent Application No. 18867638.1, dated Dec. 18, 2019, 14 pages.

* cited by examiner

METHOD AND APPARATUS FOR VERIFYING CERTIFICATES AND IDENTITIES

CROSS-REFERENCE TO RELATED APPLICATIONS

This application is a continuation of PCT Application No. PCT/CN2018/099933, filed on Aug. 10, 2018, which claims priority to Chinese Patent Application No. 201710986508.7, filed on Oct. 20, 2017, and each application is hereby incorporated by reference in its entirety.

TECHNICAL FIELD

The present application relates to the field of Internet technologies, and in particular, to a method and an apparatus for verifying certificates and identities.

BACKGROUND

In this Internet era, many things are becoming more convenient. Users only need to operate on terminal devices to process needed services. However, because some services need a relatively high security level, it is necessary to carefully check the authenticity, completeness, and compliance of the information and certificates provided by the users to alleviate the problem of being taken advantage of by criminals. Therefore, some related services need to be processed offline by using a particular service processing system.

At present, user identities are usually verified by comparing the users' faces with the photos on the users' certificates. It can prevent certificate forgery and duplication to some extent, but cannot satisfy the requirement of processing the related services online. Therefore, a more reliable solution is needed.

SUMMARY

Implementations of the present application provide a method and an apparatus for verifying certificates and identities to alleviate the following problem: The identity verification solution provided in the existing technology cannot satisfy the security level requirement for processing related services online.

An implementation of the present application provides a method for verifying certificates, including the following: obtaining a certificate image of a certificate to be verified; verifying the certificate image and a first background image that is collected on site in advance, to determine a probability that the certificate image comes from the same shooting scene as the first background image; and determining a verification result of the certificate to be verified, based on the probability that the certificate image comes from the same shooting scene as the first background image.

Optionally, the verifying the certificate image and the first background image that is collected on site in advance, to determine a probability that the certificate image comes from the same shooting scene as the first background image includes the following: comparing a background area in the certificate image with the first background image that is collected on site in advance, to obtain the degree of overlap between the certificate image and the first background image; and determining the probability that the certificate image comes from the same shooting scene as the first background image based on the degree of overlap, where the background area is an area other than the area occupied by the certificate to be verified in the certificate image.

Optionally, the comparing a background area in the certificate image with the first background image that is collected on site in advance includes the following: comparing the background area with the first background image based on information about a first position of a gyroscope when the certificate image is collected and information about a second position of the gyroscope when the first background image is collected.

Optionally, the method further includes the following: verifying the certificate image to determine a probability that the certificate image comes from a physical certificate, where the determining a verification result of the certificate to be verified includes the following: determining the verification result of the certificate to be verified, based on the probability that the certificate image comes from the same shooting scene as the first background image and the probability that the certificate image comes from the physical certificate.

Optionally, the verifying the certificate image to determine a probability that the certificate image comes from a physical certificate includes the following: analyzing image data of the certificate image, and determining the probability that the certificate image comes from the physical certificate based on an analysis result.

Optionally, the analyzing image data of the certificate image includes the following: performing difference processing on image data of at least two types of images in the certificate image to obtain an image difference; and inputting the image difference to a pre-established classification model, where the classification model is used to output a verification result based on the input image difference.

An implementation of the present application further provides a method for verifying identities, including the following: obtaining an identity certificate image of an object to be verified; obtaining a first verification result of the identity certificate corresponding to the identity certificate image based on the previous method for verifying certificates; verifying the authenticity of identity information in the identity certificate image to obtain a second verification result; and determining an identity verification result of the object to be verified, based on the first verification result and the second verification result.

Optionally, the obtaining an identity certificate image of an object to be verified includes the following: collecting on site an identity certificate image of the object to be verified.

Optionally, the obtaining an identity certificate image of an object to be verified includes the following: obtaining an identity certificate image of the object to be verified that is collected in advance.

Optionally, the verifying the authenticity of identity information in the identity certificate image to obtain a second verification result includes the following: performing online verification on the identity information in the identity certificate image, and determining the authenticity of the identity information based on a result of the online verification.

Optionally, the performing online verification on the identity information in the identity certificate image includes the following: separately performing online verification on text information and a certificate face image in the identity information.

Optionally, before the performing online verification on a certificate face image in the identity information, the method further includes the following: collecting a face image of the certificate holder on site, where the performing online verification on a certificate face image in the identity information includes the following: cross verifying the certificate face image, the face image of the certificate holder, and a face image obtained from the online verification.

Optionally, before the determining the authenticity of the identity information, the method further includes the following: performing liveness detection on the face image of the certificate holder, and obtaining a result of the liveness detection, where the determining the authenticity of the identity information includes the following: determining the authenticity of the identity information based on the result of the online verification and the result of the liveness detection.

Optionally, the method further includes the following: collecting a second background image when collecting the face image of the certificate holder on site, where the obtaining a first verification result of the identity certificate corresponding to the identity certificate image includes the following: comparing the identity certificate image, the first background image, and the second background image based on information about corresponding positions of a gyroscope when the identity certificate image, the first background image, and the second background image are collected, to determine the first verification result, where the first verification result indicates a probability that the identity certificate image, the first background image, and the second background image come from the same shooting scene.

Optionally, the determining an identity verification result of the object to be verified, based on the first verification result and the second verification result includes the following: determining that the identity verification result is Fail if the second verification result is Fail; or determining whether the identity verification result is Succeed based on the first verification result if the second verification result is Succeed.

Optionally, the determining an identity verification result of the object to be verified, based on the first verification result and the second verification result includes the following: determining a probability that the identity verification result is Succeed based on the first verification result if the second verification result is Succeed.

An implementation of the present application further provides an apparatus for verifying certificates, including the following: an acquisition unit, configured to obtain a certificate image of a certificate to be verified; and a first verification unit, configured to verify the certificate image and a first background image that is collected on site in advance, to determine a probability that the certificate image comes from the same shooting scene as the first background image, and determine a verification result of the certificate to be verified, based on the probability that the certificate image comes from the same shooting scene as the first background image.

Optionally, the first verification unit is configured to compare a background area in the certificate image with the first background image that is collected on site in advance, to obtain the degree of overlap between the certificate image and the first background image; and determine the probability that the certificate image comes from the same shooting scene as the first background image based on the degree of overlap, where the background area is an area other than the area occupied by the certificate to be verified in the certificate image.

Optionally, the first verification unit is configured to compare the background area with the first background image based on information about a first position of a gyroscope when the identity certificate image is collected and information about a second position of the gyroscope when the first background image is collected.

Optionally, the first verification unit is further configured to verify the certificate image to determine a probability that the certificate image comes from a physical certificate, and determine the verification result of the certificate to be verified, based on the probability that the certificate image comes from the same shooting scene as the first background image and the probability that the certificate image comes from the physical certificate.

Optionally, the first verification unit is further configured to analyze image data of the certificate image, and determine the probability that the certificate image comes from the physical certificate based on an analysis result.

Optionally, the first verification unit is configured to perform difference processing on image data of at least two types of images in the certificate image to obtain an image difference; and input the image difference to a pre-established classification model, where the classification model is used to output a verification result based on the input image difference.

An implementation of the present application further provides an apparatus for verifying identities, including the previous first verification unit and an acquisition unit, configured to obtain an identity certificate image of an object to be verified; a second verification unit, configured to verify the authenticity of identity information in the identity certificate image to obtain a second verification result; and a determining unit, configured to determine an identity verification result of the object to be verified, based on a first verification result that is of the identity certificate corresponding to the identity certificate image and that is obtained by the first verification unit and the second verification result.

Optionally, the acquisition unit is configured to collect on site at least two identity certificate images of the object to be verified.

Optionally, the acquisition unit is configured to obtain at least two identity certificate images of the object to be verified that are collected in advance.

Optionally, the second verification unit is configured to perform online verification on the identity information in the identity certificate image, and determine the authenticity of the identity information based on a result of the online verification.

Optionally, the second verification unit is configured to separately perform online verification on text information and a certificate face image in the identity information.

Optionally, the apparatus further includes a collection unit; the collection unit is configured to collect a face image of the certificate holder on site; and the second verification unit is configured to cross verify the certificate face image, the face image of the certificate holder, and a face image obtained from the online verification.

Optionally, the second verification unit is further configured to perform liveness detection on the face image of the certificate holder, and obtain a result of the liveness detection; and determine the authenticity of the identity information based on the result of the online verification and the result of the liveness detection.

Optionally, the collection unit is configured to collect a second background image when collecting the face image of the certificate holder on site; the first verification unit is configured to compare the identity certificate image, the first background image, and the second background image based on information about corresponding positions of a gyroscope when the identity certificate image, the first background image, and the second background image are collected, to determine the first verification result, where the first verification result indicates a probability that the identity certificate image, the first background image, and the second background image come from the same shooting scene.

Optionally, the determining unit is configured to determine that the identity verification result is Fail if the second verification result is Fail, or determine whether the identity verification result is Succeed based on the first verification result if the second verification result is Succeed.

Optionally, the determining unit is configured to determine a probability that the identity verification result is Succeed based on the first verification result if the second verification result is Succeed.

An implementation of the present application further provides an apparatus for verifying identities, including the following: a processor; and a memory, configured to store a computer executable instruction, where when the executable instruction is being executed, the processor performs the following operations: obtaining a certificate image of a certificate to be verified; verifying the certificate image and a first background image that is collected on site in advance, to determine a probability that the certificate image comes from the same shooting scene as the first background image; and determining a verification result of the certificate to be verified, based on the probability that the certificate image comes from the same shooting scene as the first background image.

An implementation of the present application further provides an apparatus for verifying identities, including the following: a processor; and a memory, configured to store a computer executable instruction, where when the executable instruction is being executed, the processor performs the following operations: obtaining an identity certificate image of an object to be verified; verifying whether the identity certificate image comes from the same shooting scene as a first background image that is collected on site in advance and/or whether the identity certificate image comes from a physical certificate, to obtain a first verification result of the identity certificate corresponding to the identity certificate image; verifying the authenticity of identity information in the identity certificate image to obtain a second verification result; and determining an identity verification result of the object to be verified, based on the first verification result and the second verification result.

The at least one technical solution used in the implementations of the present application can achieve the following beneficial effects:

In the implementations of the present application, the shooting scene and/or the source of the identity certificate image and the authenticity of the identity information in the identity certificate image are verified. Compared with the existing solution of using a professional authorization machine to compare a face with a certificate face image to implement identity verification, it can effectively alleviate the problems of certificate content forgery and certificate duplication without using the professional authorization machine, thereby providing an identity verification capability that satisfies the security level requirement for processing the related service online.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

Figure 1:
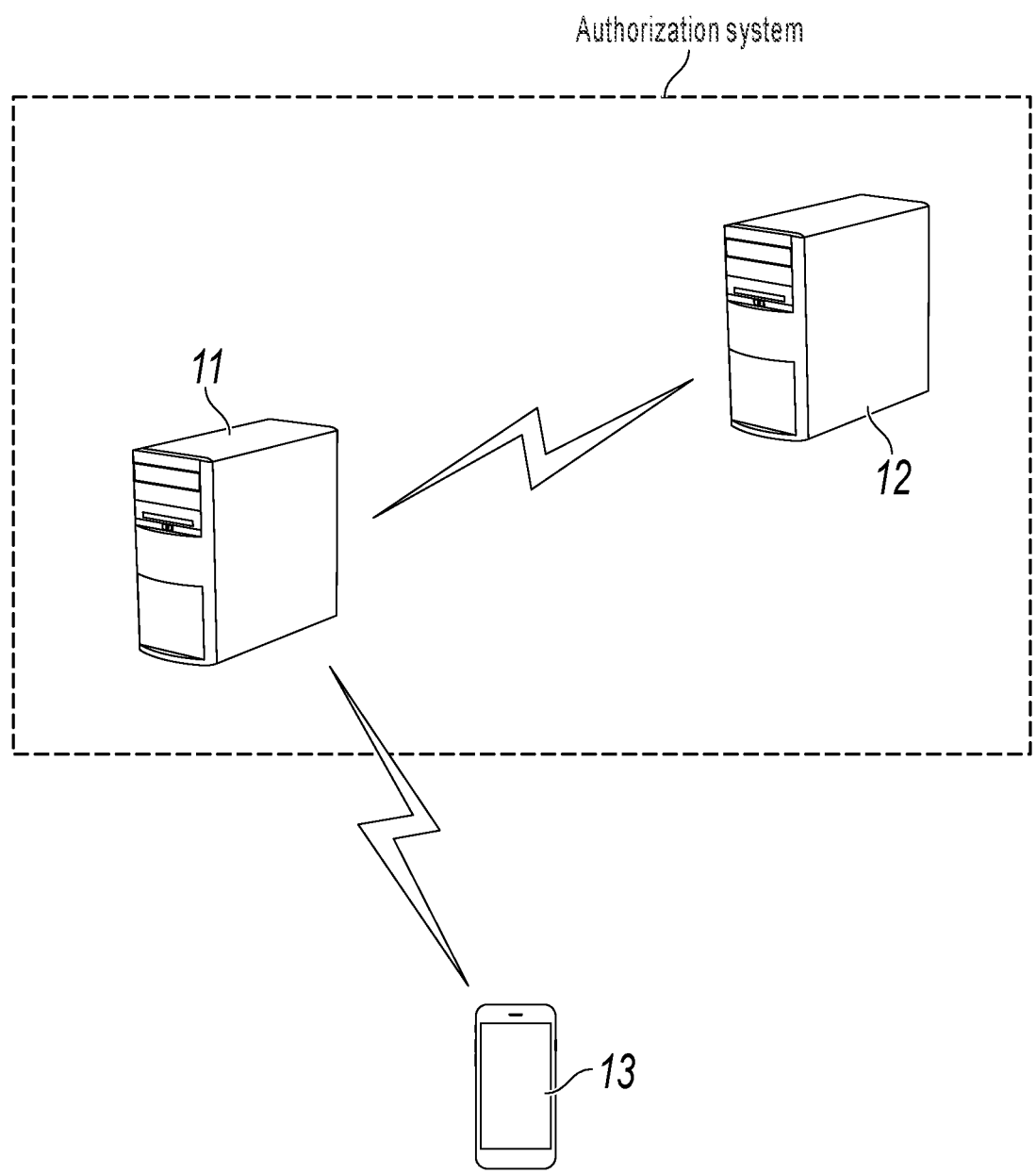
FIG. 1 is a diagram illustrating an application scenario of implementations of the present application.

FIG. 1 shows an example application scenario of implementations of the present application. In the scenario, when processing a related service, a user can fill in related information by using an application (app) on terminal device 13. When a preset condition is satisfied, the app can collect an identity certificate image and upload the identity certificate image to device 12 and/or device 11 in a service authorization system. Device 12 and/or device 11 verify/verifies the identity certificate image and respond/responds to the service processed by the user. The related service here can be any service processed online, for example, remote registration. Correspondingly, the identity certificate image can be an image of the user's identity card.

Another example application scenario of the implementations of the present application can be as follows:

The user uses the terminal device to display an identity certificate image to a client device of the authorization system. Or the user displays an identity certificate to the client device of the authorization system, and the client device collects an identity certificate image. Then the client device uploads the identity certificate image to a server of the authorization system. The server performs verification and returns a verification result to the client device. The client device determines whether to authorize the user based on the verification result.

The present process can occur when the user goes through a security check or logs in to a platform that needs authorization. In addition, whether the user processing the service needs to be the user corresponding to the identity certificate is determined as determined by the service provider.

In addition to the two previously described scenarios, the implementations of the present application can be applied in other scenarios. The scenarios are not particularly limited provided that the solutions provided in the present application can be used technically. The technical solutions provided in the implementations of the present application are described in detail below with reference to the accompanying drawings.

Implementation 1

Figure 2:
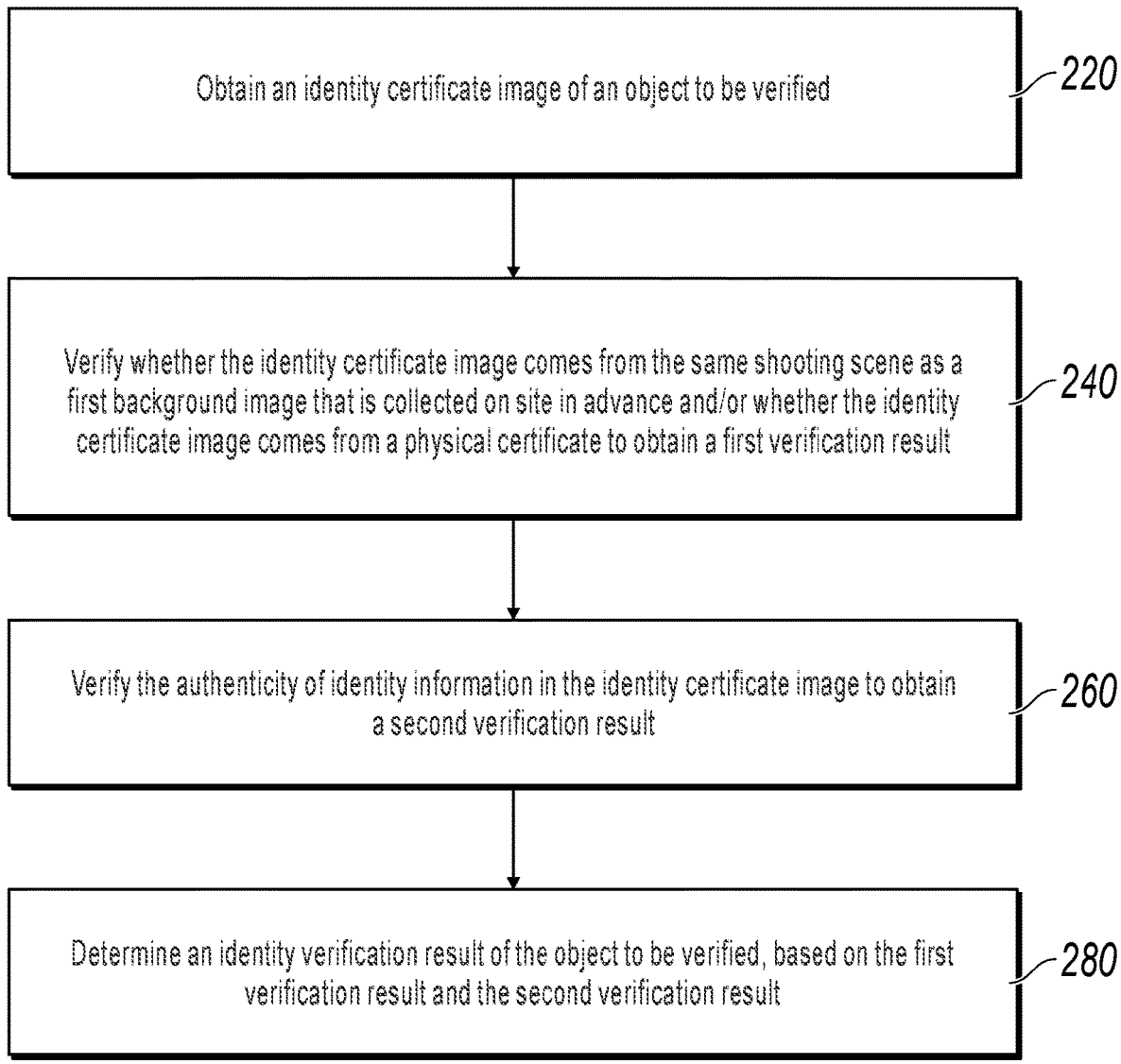
FIG. 2 is a schematic flowchart illustrating a method for verifying identities, according to Implementation 1 of the present application.

FIG. 2 is a schematic flowchart illustrating a method for verifying identities, according to Implementation 1 of the present application. Referring to FIG. 2, the method can include the following steps.

Step 220: Obtain an identity certificate image of an object to be verified.

The identity certificate image can be obtained by shooting an identity certificate. The identity certificate can be a certificate that can prove the identity of the object to be verified, for example, an identity card, a temporary identity card, an academic certificate, and a driver's license. The identity certificate records identity information of the object to be verified, for example, a name, an identity card number, and a student number.

It is worthwhile to note that an implementation method of step 220 can be collecting on site an identity certificate image of the object to be verified. The "site" here is a "site" that needs identity verification. It can be a site on which an identity is verified to process a service, for example, a site on which an image of the identity card of the object to be verified is collected when a registration service is processed. Or it can be another site, for example, a site on which an image of a related certificate of the object to be verified is collected during a security check.

With reference to FIG. 1, it is not difficult to understand that a method of "collecting the identity certificate image on site" can be as follows:

The user opens the camera interface, or an authorization system calls the camera of a terminal device based on a user operation to open the camera interface, and then shoots the identity certificate of the object to be verified to obtain the identity certificate image.

Another implementation method of step 220 can be obtaining an identity certificate image of the object to be verified that is collected in advance. The "in advance" here is distinguished from the "on site" in the previous implementation method of step 220. An example of the present implementation method can be storing a previously shot identity certificate image in a predetermined position, and obtaining the corresponding identity certificate image based on a storage address when identity verification is needed.

Step 240: Verify a source of the identity certificate image and/or an anti-counterfeit mark in the identity certificate image to obtain a first verification result.

The source of the identity certificate image in the present step can be, for example, a physical identity certificate, a certificate photo processed or not processed by using PHOTOSHOP, a certificate copy, screen duplication, and a predetermined shooting scene. The anti-counterfeit mark can be pasted, printed, or thermally transferred on the surface, package, or accessory (such as a merchandise tag, a business card, and an anti-counterfeit card) of a target object. For example, anti-counterfeit marks on an identity card include the national emblem, certificate name, pattern of the Great Wall, issuing authority of the certificate, validity period, colorful patterns, etc.

It is worthwhile to note that because different services need different security levels, a legal source and the completeness of the anti-counterfeit mark can be selectively set. For a service needing a relatively high security level, for example, remote registration, the following condition needs to be satisfied: The source of the identity certificate image is the physical identity certificate, and the identity certificate image has a complete anti-counterfeit mark. Or a probability of satisfying the condition reaches a certain threshold. For a service needing a relatively low security level, the requirements that needs to be satisfied can be appropriately lower.

The following uses "remote registration" as an example to describe an implementation method of step 240. First, implementation methods of verifying the source of the identity certificate image in step 240 are described by using examples, including the following: verifying whether the identity certificate image comes from the physical certificate, and verifying whether the identity certificate image comes from the same shooting environment as an image collected on site. Then five implementation methods are listed here based on the implementation methods of verifying the source of the identity certificate image. A person skilled in the art can obtain other implementation methods based on these implementation methods, and the obtained other implementation methods fall within the protection scope of the present application.

A first implementation method can be as follows:

The present implementation method can be applicable to a scenario needing a relatively high security level, for example, the identity certificate image needs to have the complete anti-counterfeit mark, or a probability of satisfying the condition needs to reach a certain threshold.

The present implementation method can be as follows: determining an anti-counterfeit mark in an identity certificate corresponding to the type of the identity certificate image; verifying the anti-counterfeit mark in the identity certificate image based on the determined anti-counterfeit mark; and determining the first verification result based on a result of the verification, where the first verification result indicates a probability that the identity certificate image is verified. The anti-counterfeit mark includes at least one of a watermark text, a miniature text, a shading line, gravure printing, color cast, an anti-counterfeit secret mark, and an anti-counterfeit font.

It is worthwhile to note that different types of identity certificates correspond to different anti-counterfeit marks. For example, an identity card, a passport, and a driver's license each have a corresponding anti-counterfeit mark. Correspondingly, the type of the collected identity certificate image can be determined based on a certificate type selected when the user is processing the service. Or image recognition is performed on the collected identity certificate image to determine the type of the identity certificate image.

In addition, it is not difficult to understand that a method of training a classification model can be used. The anti-counterfeit mark in the identity certificate image can be input to the classification model, or the identity certificate image can be input to the classification model. The classification model outputs a probability that the anti-counterfeit mark of the identity certificate image is verified. A method of scanning the identity certificate image to obtain the anti-counterfeit mark can be, for example, using transmitted light to recognize the watermark text.

A second implementation method can be as follows:

The present implementation method can be applicable to a scenario needing a relatively high security level, for example, the identity certificate image needs to come from the physical identity certificate, or a probability of satisfying the condition needs to reach a certain threshold. The present implementation method can be implemented by using the following two solutions.

A first solution (at least one identity certificate image is needed) is as follows: first, verifying the identity certificate image for the first time to determine a probability that the identity certificate image comes from screen duplication; then verifying the identity certificate image for the second time to determine a probability that the identity certificate image comes from a copy; and finally, determining a probability that the identity certificate image comes from the physical certificate based on the probability that the identity certificate image comes from screen duplication and the probability that the identity certificate image comes from a copy. A sequence of the first time of verification and the second time of verification is not limited here. The two times of verification can be performed simultaneously or in sequence.

In the first solution, the first time of verification can be performed by using the following method: detecting a characteristic of the certificate area in the identity certificate image based on a predetermined specific characteristic, to determine the difference between the certificate area of a normal identity certificate image and the certificate area of an identity certificate image that comes from screen duplication with reference to a screen moire classification model, where the specific characteristic can be, for example, screen moire, certificate watermark, and reflective print; and detecting a characteristic of the frame of the identity certificate image based on a predetermined specific characteristic, to determine the difference between the frame of the normal identity certificate image and the frame of the identity certificate image that comes from screen duplication with reference to a screen frame classification model, for example, the identity certificate image that comes from screen duplication usually has a black frame, where the specific characteristic can be, for example, screen moire, certificate watermark, and reflective print. The certificate area is the area of the identity certificate corresponding to the identity certificate image.

In the first solution, the second time of verification can be performed by using the following method: performing characteristic detection on image data of the identity certificate image based on a pixel-level characteristic corresponding to a black and white copy and/or a color copy. A specific implementation method can be as follows: detecting a corresponding pixel-level characteristic in the identity certificate image based on a black and white copy classification DNN model to determine a probability that the identity certificate image is a black and white copy; and detecting a corresponding pixel-level characteristic in the identity certificate image based on a color copy classification DNN model to determine a probability that the identity certificate image is a color copy.

After the first time of verification and the second time of verification, a probability that the identity certificate image comes from the authentic physical identity certificate is determined based on at least one of the results output by the screen moire classification model, the screen frame classification model, the black and white copy classification DNN model, and the color copy classification DNN model.

A second solution is as follows: analyzing image data of the identity certificate image to determine the first verification result, where the first verification result indicates the probability that the identity certificate image comes from the physical certificate. The present solution can be as follows: performing image recognition on image data of a single-frame image in the identity certificate image to verify whether a specific pixel-level characteristic exists in the identity certificate image, and then determining the first verification result based on the existence of the specific characteristic in the identity certificate image; or inputting the image data to a classification model, and obtaining the first verification result output by the classification model, where the specific characteristic can be, for example, screen moire, certificate watermark, and reflective print; or when there are at least two identity certificate images, performing difference processing on image data of at least two types of images in the identity certificate images to obtain an image difference; and inputting the image difference to a pre-established classification model, where the classification model is used to output the first verification result based on the input image difference, and the at least two types of images can be collected in different shooting conditions, for example, a type of image collected in the natural condition and a type of image collected by using the flash, or images collected at different exposures. Further, objects of the difference processing can be, for example, an image collected in the natural condition and an image collected by using the flash.

A third implementation method can be as follows:

The present implementation method can be applicable to a scenario needing an extremely high security level, for example, the identity certificate image needs to come from the authentic physical identity certificate and have the complete anti-counterfeit mark, or a probability of satisfying the condition needs to reach a certain threshold.

An implementation process of the present implementation method is similar to implementation processes of the first and second implementation methods. Therefore, similarities are omitted here. In addition, the third implementation method further includes the following: determining the first verification result, that is, determining the credibility of the identity certificate of the object to be verified corresponding to the identity certificate image, based on the probability that the identity certificate image is verified and the probability that the identity certificate image comes from the physical certificate.

A fourth implementation method can be as follows:

The present implementation method can be applicable to a scenario needing a relatively high security level, for example, the identity certificate image needs to come from the same shooting scene as a first background image, or a probability of satisfying the condition needs to reach a certain threshold. The security level requirement is related to the identity certificate image that needs to be shot. For example, a higher requirement indicates that more identity certificate images need to be shot, and more identity certificate images need to come from the same shooting scene as the first background image.

The present implementation method can be as follows: collecting one or more background images (referred to as the first background image below) before performing step 220; and then comparing the identity certificate image with the first background image to determine the degree of overlap between the two images.

It is not difficult to understand that if the degree of overlap between the two images is greater than a certain threshold, the two images are shot in the same shooting scene. In addition, a comparison method can be as follows: comparing the identity certificate image with one background image; or combining the background images into one background image, and then comparing the combined background image with the identity certificate image.

A solution for determining whether the two images come from the same shooting scene can include the following: comparing a background area in the identity certificate image with the first background image to obtain the degree of overlap between the identity certificate image and the first background image; and determining the first verification result based on the degree of overlap, where the first verification result indicates a probability that the identity certificate image comes from the same shooting scene as the first background image. The background area is an area other than the area occupied by the identity certificate in the identity certificate image.

To further improve the verification effect and efficiency in the fourth implementation method, the angles of the identity certificate image and the first background image can be adjusted based on information about a first position of a gyroscope when the identity certificate image is collected and information about a second position of the gyroscope when the first background image is collected, to compare the background area and the first background image that are corresponding to the same position information of the gyroscope and obtain the degree of overlap. The probability that the identity certificate image and the first background image are shot in the same shooting scene is determined based on the degree of overlap.

For example, before the identity certificate image is collected, the first background image, for example, the image of a desk and its surroundings, is shot when the gyroscope is in the second position. Then the identity certificate image is collected when the gyroscope is in the first position. Afterwards, the certificate area and the background area in the identity certificate image are separated, and the background area is compared with the first background image based on position information of the gyroscope to obtain the degree of overlap. The certificate area is the area occupied by the identity certificate in the identity certificate image.

A fifth implementation method can be as follows:

The present implementation method can be applicable to a scenario needing a relatively high security level, for example, the material of the certificate needs to be the material of an authentic certificate, or a probability of satisfying the condition needs to reach a certain threshold.

The present implementation method can be as follows: determining the material of the certificate based on an image difference that is obtained based on image data of at least two types of images; comparing the material of the certificate with the material of an authentic certificate of the corresponding type; and determining a probability that the certificate is an authentic certificate based on a result of the comparison, and using the probability as the first verification result.

It is not difficult to understand that different types of certificates can be made of different materials, and different certificate materials have large differences in different shooting conditions. Therefore, the image difference between the two types of images can be input to a trained classification model, and the classification model outputs the first verification result.

It is not difficult to understand that the previous feasible implementation methods can be appropriately selected or cross set based on the service to be processed and the security level needed by the service. Details are omitted here for simplicity.

Step 260: Verify the authenticity of identity information in the identity certificate image to obtain a second verification result.

It is worthwhile to note that an implementation method of step 260 can be as follows: performing online verification on the identity information in the identity certificate image, and determining the authenticity of the identity information based on a result of the online verification.

A specific network verification method can be as follows: Based on the existing intranet and internet interconnection platform of the People's Bank of China (PBC), the citizen identity information system for online verification forwards, to the information sharing system of the Ministry of Public Security (MPS), verification requests submitted by PBC users, or submitted by using the front-end systems of the account system, the credit information system, and the anti-money laundering system; receives and forwards verification requests submitted by commercial bank users or submitted by using the front-end system of the integrated service system; and receives and forwards a verification result from the information sharing system of the MPS.

In addition, objects of the online verification can include text information and a certificate face image in the identity information. The text information can be the certificate ID, the name, and other information obtained based on optical character recognition (OCR). The certificate face image is a recognized head portrait.

Step 280: Determine an identity verification result of the object to be verified, based on the first verification result and the second verification result.

It is worthwhile to note that based on the first verification result and the second verification result respectively obtained in step 240 and step 260, an implementation method of the preset step can be as follows: determining that the identity verification result is Fail if the second verification result is Fail; or determining whether the identity verification result is Succeed based on the first verification result if the second verification result is Succeed. The steps can be as follows: determining that the identity verification result is Fail when a probability that the first verification result is Succeed is lower than a predetermined threshold; and determining that the identity verification result is Succeed when the probability that the first verification result is Succeed is greater than the predetermined threshold.

Another implementation method of the present step can be as follows: determining a probability that the identity verification result is Succeed or Fail based on the first verification result if the second verification result is Succeed.

For the two implementation methods of step 280, because image shooting angle and shooting quality problems may exist in each of the previous steps, the entire procedure is not sequentially executed. Therefore, the present implementation provides a decision engine to evaluate a result of the entire verification based on a certain rule. For example, the influencing factors of the first verification result can include one or more of the following: a probability that the anti-counterfeit mark in the identity certificate image is verified, the probability that the identity certificate image comes from the physical certificate, and a probability that the identity certificate image comes from the same scene as an on-site image. Therefore, a corresponding weight can be set, based on needs and experience, for each influencing factor involved in determining the first verification result, and a probability corresponding to the first verification result is determined based on the corresponding weight and probability. For example, the influencing factors involved in determining the first verification result, that is, the probability that the anti-counterfeit mark in the identity certificate image is verified, the probability that the identity certificate image comes from the physical certificate, and the probability that the identity certificate image comes from the same scene as the on-site image are 60%, 70%, and 80% respectively, and the weights are set to 30%, 30%, and 40% respectively. In this case, a finally calculated probability corresponding to the first verification result is 71%.

In addition, the source of the identity certificate image, the anti-counterfeit mark in the identity certificate image, and the authenticity of the identity information in the identity certificate image can be verified simultaneously to improve the speed and efficiency of certificate authenticity detection.

It is not difficult to understand that, in the present implementation of the present disclosure, only step 220 and step 240 can be performed to complete the certificate verification process. The process can be, for example, as follows: obtaining a certificate image of a certificate to be verified, verifying a source of the certificate image and/or an anti-counterfeit mark in the certificate image to obtain a first verification result, and determining a verification result of the certificate to be verified, based on the first verification result; or obtaining at least one certificate image of a certificate to be verified, verifying the certificate image to determine the probability that the certificate image comes from screen duplication, and obtaining a verification result of the certificate to be verified, based on the probability that the certificate image comes from screen duplication; or verifying the certificate image to determine the probability that the certificate image comes from a copy, and obtaining a verification result of the certificate to be verified, based on the probability that the certificate image comes from a copy; or verifying the certificate image to determine the probability that the certificate image comes from screen duplication and the probability that the certificate image comes from a copy, and obtaining a verification result of the certificate to be verified, based on the probability that the certificate image comes from screen duplication and the probability that the certificate image comes from a copy; or obtaining a certificate image of a certificate to be verified, and verifying whether the certificate image comes from the same shooting scene as a first background image that is collected on site in advance, to obtain a verification result of the certificate to be verified.

Because the certificate verification process is similar to the related descriptions in step 220 and step 240, details are omitted here for simplicity. In addition, the previous parallel certificate verification solutions can be combined based on actual needs. For example, the anti-counterfeit mark verification is combined with the verifying whether the certificate image comes from the same shooting scene as the background image.

It can be seen that the source, the anti-counterfeit mark, and the identity information of the identity verification image are verified in the present implementation of the present disclosure. It can effectively alleviate the problems of certificate content forgery and certificate duplication without using a professional authorization machine, thereby providing an identity verification capability that satisfies the security level requirement for processing the related service online.

Implementation 2

Figure 3:
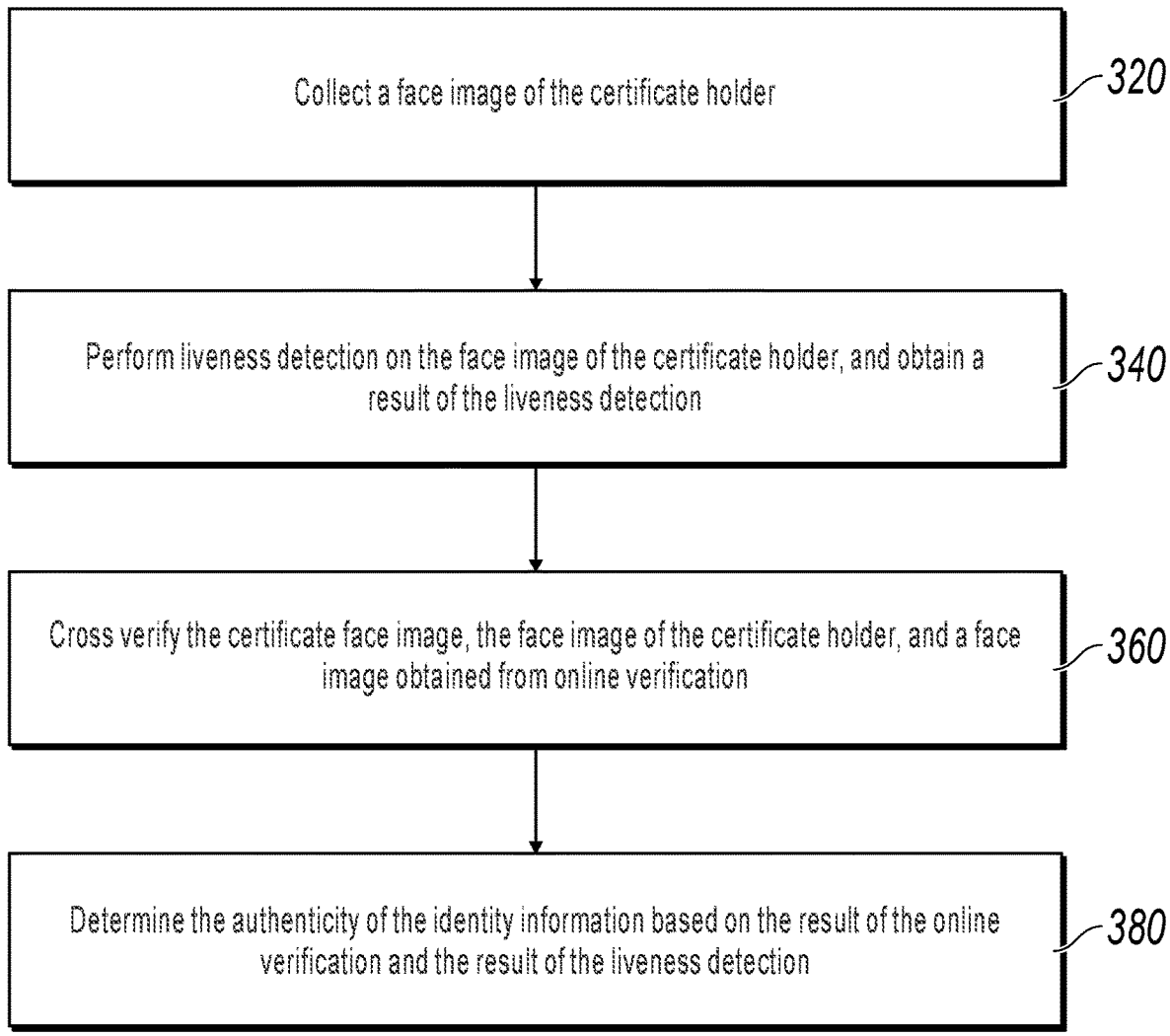
FIG. 3 is a schematic flowchart illustrating a method for verifying identities, according to Implementation 2 of the present application.

FIG. 3 is a schematic flowchart illustrating a method for verifying identities, according to Implementation 2 of the present application. Referring to FIG. 3, based on Implementation 1, the present implementation can further include the following steps.

Step 320: Collect a face image of the certificate holder.

It is worthwhile to note that an implementation method of step 320 can be as follows: using a front-facing camera to collect "the face image of the certificate holder" at the same time of or after using a rear-facing camera to collect the identity certificate image on site".

Another implementation method can be as follows: calling a camera to collect "the face image of the certificate holder" when a probability that the first verification result is Succeed reaches a predetermined threshold.

Still another implementation method can be as follows: performing online verification on the text information in the identity certificate image, and calling a camera to collect "the face image of the certificate holder" after obtaining the verification result that the text information is authentic.

Step 340: Perform liveness detection on the face image of the certificate holder, and obtain a result of the liveness detection.

It is worthwhile to note that the liveness detection is performed on a single-frame image or a plurality of images collected in step 320 to determine whether the certificate holder is a living body. The liveness detection can be blinking discrimination, mouth opening discrimination, parallax analysis, etc. Because the liveness detection is a relatively mature technology, details are omitted here for simplicity.

Step 360: Cross verify the certificate face image, the face image of the certificate holder, and a face image obtained from online verification to obtain a result of the online verification performed on the certificate face image.

An implementation method of step 360 can be as follows: verifying the certificate face image in the identity certificate image and the face image obtained from the online verification to obtain a third verification result; comparing the certificate face image with the face image collected on site to obtain a fourth verification result; and determining the result of the online verification based on the third verification result and the fourth verification result.

Step 380: Determine the authenticity of the identity information based on the result of the online verification performed on the certificate face image, the result of the liveness detection, and the result of the online verification performed on the text information, to obtain a second verification result.

It is not difficult to understand that the result of the entire online verification is evaluated using the decision engine in the present implementation, based on the result of the online verification performed on the text information, the result of the online verification performed on the certificate face image, and the result of the liveness detection in combination with a certain rule. The rule here can be, for example, setting weights for the verification results and the result of the liveness detection.

In addition, in the present implementation, the rear-facing camera continues to collect one or more background images (a second background image for short) when the front-facing camera collects the face image in step 320. Correspondingly, to further improve the accuracy of verifying whether the identity certificate image comes from the same shooting scene as the background image, the identity certificate image, the first background image, and the second background image can be compared based on information about corresponding positions of the gyroscope when the identity certificate image, the first background image, and the second background image are collected, to determine the first verification result. The first verification result indicates a probability that the identity certificate image, the first background image, and the second background image come from the same shooting scene.

It is worthwhile to note that, in the present implementation of the present application, based on Implementation 1, the face image of the certificate holder collected on site is introduced, and the liveness detection is performed on the face image; then the verification is performed based on the certificate face image, the face image of the certificate holder, and the face image obtained from the online verification; and the authenticity of the identity information is determined based on the results of the liveness detection and online verification. It can alleviate illegal use of identity due to inconsistency between the identity of the certificate holder and the identity proved by the identity certificate, and further improve the identity verification capability.

It is worthwhile to note that all steps of the methods provided in Implementation 1 and Implementation 2 can be performed by the same device or different devices. For example, step 220 and step 240 can be performed by device 1, and step 260 can be performed by device 2. For another example, step 220 can be performed by device 1, and step 240 and step 260 can be performed by device 2.

For brief description, the previous method implementations are expressed as a combination of a series of actions. However, a person skilled in the art should know that the implementations of the present disclosure are not limited to the described action sequence because some steps can be performed in other sequences or performed simultaneously according to the implementations of the present disclosure. In addition, a person skilled in the art should also know that all the implementations described in the specification are examples of implementations, and the actions mentioned are not necessarily mandatory to the implementations of the present disclosure.

Implementation 3

Figure 4:
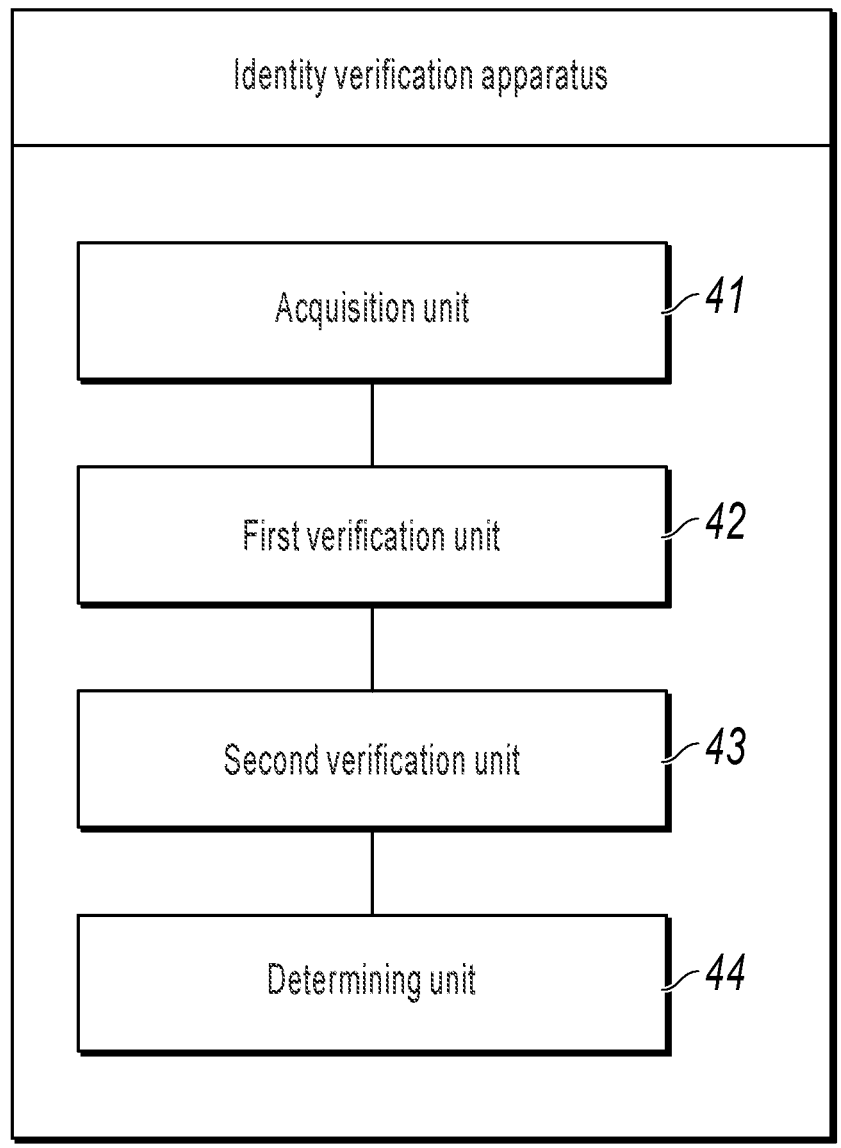
FIG. 4 is a schematic structural diagram illustrating an apparatus for verifying identities, according to Implementation 3 of the present application.

FIG. 4 is a schematic structural diagram illustrating an apparatus for verifying identities, according to Implementation 3 of the present application. The apparatus includes an acquisition unit 41, a first verification unit 42, a second verification unit 43, and a determining unit 44.

The acquisition unit 41 is configured to obtain an identity certificate image of an object to be verified.

The first verification unit 42 is configured to verify a source of the identity certificate image and/or an anti-counterfeit mark in the identity certificate image to obtain a first verification result.

The second verification unit 43 is configured to verify the authenticity of identity information in the identity certificate image to obtain a second verification result.

The determining unit 44 is configured to determine an identity verification result of the object to be verified, based on the first verification result and the second verification result.

The following uses examples to describe the operating principle of each functional module in the present implementation.

An implementation method of the function of the acquisition unit 41 can be as follows: collecting on site an identity certificate image of the object to be verified; or obtaining an identity certificate image of the object to be verified that is collected in advance.

Implementation methods of the function of the first verification unit 42 can be as follows:

The first verification unit 42 is configured to determine an anti-counterfeit mark in an identity certificate corresponding to the type of the identity certificate image; verify the anti-counterfeit mark in the identity certificate image based on the determined anti-counterfeit mark; and determine the first verification result based on a result of the verification, where the first verification result indicates a probability that the identity certificate image is verified, and the anti-counterfeit mark includes at least one of a watermark text, a miniature text, a shading line, gravure printing, color cast, an anti-counterfeit secret mark, and an anti-counterfeit font.

The first verification unit 42 is configured to verify the identity certificate image for the first time to determine a probability that the identity certificate image comes from screen duplication; verify the identity certificate image for the second time to determine a probability that the identity certificate image comes from a copy; and determine a probability that the identity certificate image comes from a physical certificate based on the probability that the identity certificate image comes from screen duplication and the probability that the identity certificate image comes from a copy. The first time of verification includes the following: detecting a characteristic of the certificate area and/or the frame in the identity certificate image based on a predetermined specific characteristic, where the certificate area is the area of the identity certificate corresponding to the identity certificate image. The second time of verification includes the following: performing characteristic detection on image data of the identity certificate image based on a pixel-level characteristic corresponding to a black and white copy and/or a color copy.

The first verification unit 42 is configured to analyze image data of the identity certificate image to determine the first verification result, where the first verification result indicates the probability that the identity certificate image comes from the physical certificate.

The first verification unit 42 is configured to perform image recognition on image data of a single-frame image in the identity certificate image, or perform difference processing on image data of at least two types of images in the identity certificate image to obtain an image difference; and input the image difference to a pre-established classification model, where the at least two types of images can be collected in different shooting conditions, for example, a type of image collected in the natural condition and a type of image collected by using the flash, or images collected at different exposures.

The first verification unit 42 is configured to determine an anti-counterfeit mark in an identity certificate corresponding to the type of the identity certificate image; verify the anti-counterfeit mark in the identity certificate image based on the determined anti-counterfeit mark, and determine, based on a result of the verification, the probability that the identity certificate image is verified; analyze the image data of the identity certificate image to determine the probability that the identity certificate image comes from the physical certificate; and determine the first verification result based on the probability that the identity certificate image is verified and the probability that the identity certificate image comes from the physical certificate.

The first verification unit 42 is configured to verify whether the identity certificate image comes from the same shooting scene as a first background image that is collected on site in advance, to obtain the first verification result. The present implementation method can include the following: comparing a background area in the identity certificate image with the first background image that is collected on site in advance, to obtain the degree of overlap between the identity certificate image and the first background image; and determining the first verification result based on the degree of overlap, where the first verification result indicates a probability that the identity certificate image comes from the same shooting scene as the first background image, and the background area is an area other than the area occupied by the identity certificate in the identity certificate image.

The comparing the background area with the first background image that is collected on site in advance includes the following: comparing the background area and the first background image based on information about a first position of a gyroscope when the identity certificate image is collected and information about a second position of the gyroscope when the first background image is collected.

In addition, a second background image is collected when a face image of the certificate holder is collected on site.

The verifying whether the identity certificate image comes from the same shooting scene as a first background image that is collected on site in advance, to obtain the first verification result includes the following: comparing the identity certificate image, the first background image, and the second background image based on information about corresponding positions of the gyroscope when the identity certificate image, the first background image, and the second background image are collected, to determine the first verification result, where the first verification result indicates a probability that the identity certificate image, the first background image, and the second background image come from the same shooting scene.

An implementation method of the function of the second verification unit 43 can be as follows: performing online verification on the identity information in the identity certificate image; and determining the authenticity of the identity information based on a result of the online verification, where online verification can be separately performed on text information and a certificate face image in the identity information.

An implementation method of the function of the determining unit 44 can be as follows: determining that the identity verification result is Fail if the second verification result is Fail; determining a probability that the identity verification result is Succeed based on the first verification result if the second verification result is Succeed; or determining whether the identity verification result is Succeed if the second verification result is Succeed.

It can be seen that the source, the anti-counterfeit mark, and the identity information of the identity verification image are verified in the present implementation of the present disclosure. It can effectively alleviate the problems of certificate content forgery and certificate duplication without using a professional authorization machine, thereby providing an identity verification capability that satisfies the security level requirement for processing the related service online.

Implementation 4

Figure 5:
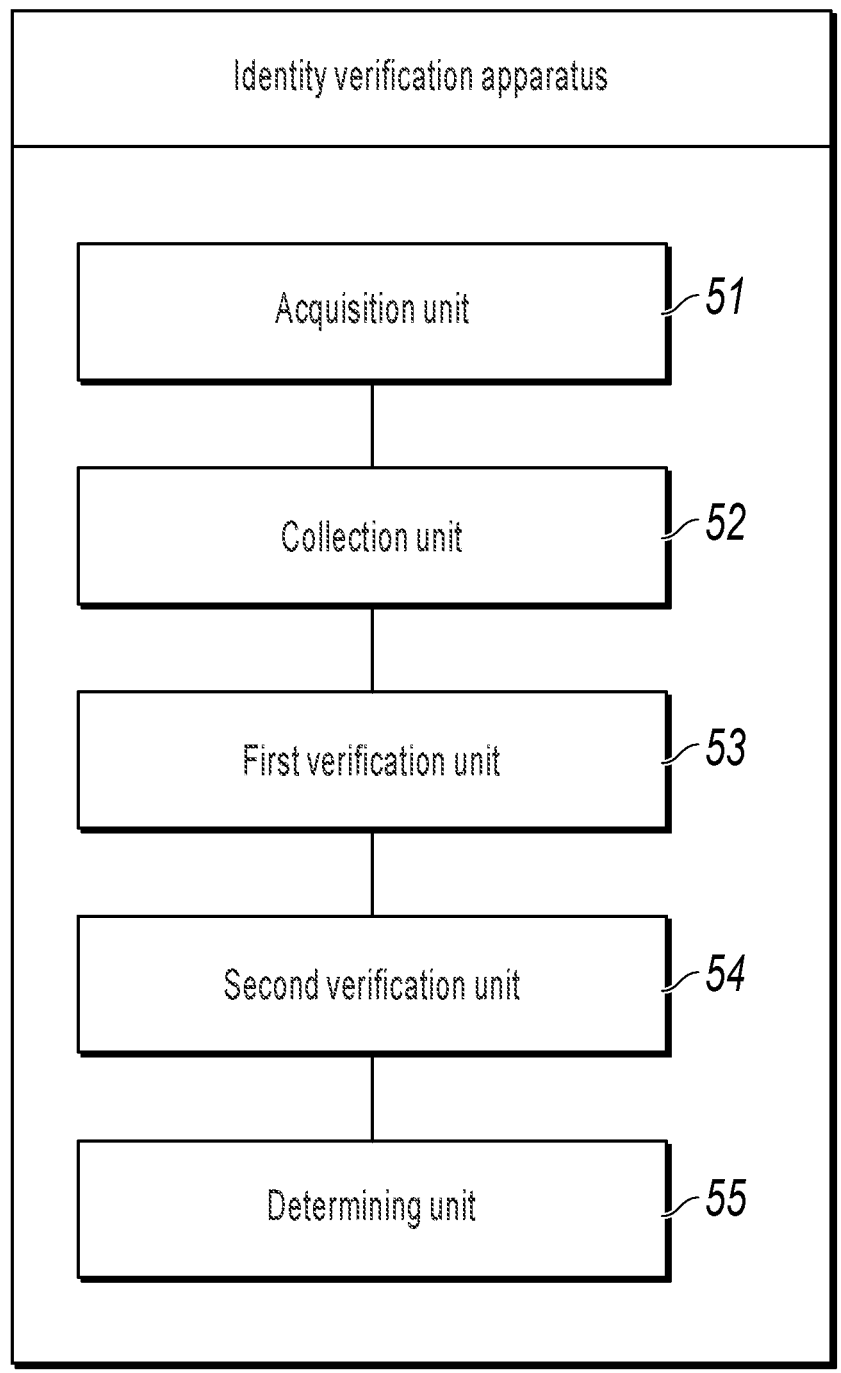
FIG. 5 is a schematic structural diagram illustrating an apparatus for verifying identities, according to Implementation 4 of the present application.

FIG. 5 is a schematic structural diagram illustrating an apparatus for verifying identities, according to Implementation 4 of the present application. Referring to FIG. 5, the apparatus includes an acquisition unit 51, a collection unit 52, a first verification unit 53, a second verification unit 54, and a determining unit 55.

The acquisition unit 51 and the first verification unit 53 are respectively similar to the acquisition unit 41 and the first verification unit 42 in Implementation 3. Therefore, details are omitted here for simplicity.

In addition, based on Implementation 3, in the present implementation, the collection unit 52 is configured to collect a face image of the certificate holder on site; and the second verification unit 54 is configured to cross verify the certificate face image, the face image of the certificate holder, and a face image obtained from online verification.

The second verification unit 54 is further configured to perform liveness detection on the face image of the certificate holder, and obtain a result of the liveness detection; and determine the authenticity of the identity information based on the result of the online verification and the result of the liveness detection.

It can be seen that, in the present implementation of the present application, based on Implementation 3, the face image of the certificate holder collected on site is introduced, and the liveness detection is performed on the face image; then the verification is performed based on the certificate face image, the face image of the certificate holder, and the face image obtained from the online verification; and the authenticity of the identity information is determined based on the result of the liveness detection and the result of the online verification. It can alleviate inconsistency between the identity of the certificate holder and the identity proved by the identity certificate, and further improve the identity verification capability.

The apparatus implementation is basically similar to the method implementation, and therefore is described briefly. For related parts, refer to partial descriptions in the method implementation.

It is worthwhile to note that, in components of the apparatus of the present disclosure, the components are logically divided based on the functions to be implemented. However, the present disclosure is not limited to this, and the components can be divided or combined as needed.

Implementation 5

Figure 6:
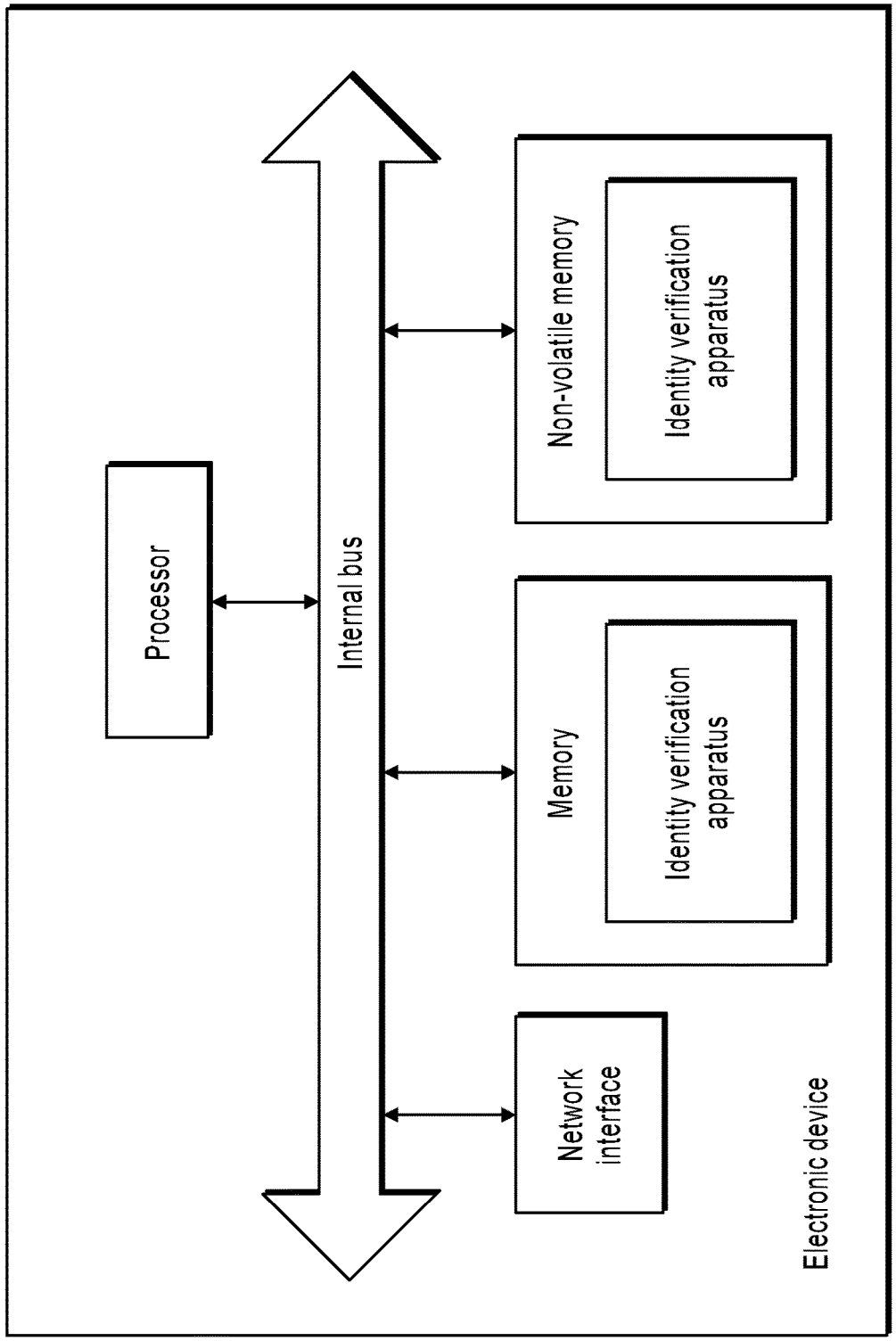
FIG. 6 is a schematic structural diagram illustrating an electronic device, according to Implementation 5 of the present application.

FIG. 6 is a schematic structural diagram illustrating an electronic device, according to Implementation 5 of the present application. Referring to FIG. 6, the electronic device includes a processor, an internal bus, a network interface, memory, and a non-volatile memory, and certainly can further include other hardware needed by a service. The processor reads a corresponding computer program from the non-volatile memory to the memory for running, and an apparatus for verifying identities is logically formed. Certainly, in addition to a software implementation, the present application does not exclude another implementation, for example, a logic device or a combination of hardware and software. That is, an execution body of the following processing procedure is not limited to each logical unit, and can also be hardware or a logic device.

The network interface, the processor, and the memory can be interconnected by using a bus system. A bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of indication, the bus is indicated by using only one double-headed arrow in FIG. 6. However, it does not mean that there is only one bus or only one type of bus.

The memory is configured to store a program. The program can include program code, and the program code includes a computer operation instruction. The memory can include a read-only memory and a random access memory, and provides an instruction and data for the processor. The memory can include a high-speed random access memory (RAM), and can further include a non-volatile memory (non-volatile memory) such as at least one magnetic disk memory.

The processor is configured to execute the program stored in the memory, and perform the following operations: obtaining at least one certificate image of a certificate to be verified, verifying the certificate image to determine a probability that the certificate image comes from screen duplication, and obtaining a verification result of the certificate to be verified, based on the probability that the certificate image comes from screen duplication; or obtaining at least one certificate image of a certificate to be verified, verifying the certificate image to determine a probability that the certificate image comes from a copy, and obtaining a verification result of the certificate to be verified, based on the probability that the certificate image comes from a copy; or obtaining at least one certificate image of a certificate to be verified, verifying the certificate image to determine the probability that the certificate image comes from screen duplication and the probability that the certificate image comes from a copy, and obtaining a verification result of the certificate to be verified, based on the probability that the certificate image comes from screen duplication and the probability that the certificate image comes from a copy; or obtaining a certificate image of a certificate to be verified, and verifying whether the certificate image comes from the same shooting scene as a first background image that is collected on site in advance, to obtain a verification result of the certificate to be verified; or obtaining a certificate image of a certificate to be verified, and verifying a source of the certificate image and/or an anti-counterfeit mark in the certificate image to obtain a first verification result, and determining a verification result of the certificate to be verified, based on the first verification result; or verifying the authenticity of identity information in the identity certificate image based on the previous certificate verification solutions to obtain a second verification result, and determining an identity verification result of the object to be verified corresponding to the certificate to be verified, based on the verification result of the certificate to be verified and the second verification result.

The previous method performed by the apparatus for verifying identities or a master (Master) node and disclosed in the implementations shown in FIG. 2 to FIG. 5 of the present application can be applied to a processor, or can be implemented by the processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc., or can be a digital signal processor (DSP), an application-specific integrated circuit (ASIC), a field programmable gate array (FPGA) or another programmable logic device, a discrete gate or a transistor logic device, a discrete hardware component, etc. The processor can implement or perform the methods, the steps, and the logical block diagrams disclosed in the implementations of the present application. The general purpose processor can be a microprocessor or any suitable processor. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The apparatus for verifying identities can further perform the method in FIG. 2 or FIG. 3, and implement a method performed by the master node.

Implementation 6

Based on the same invention creation, the present implementation of the present application further provides a computer readable storage medium. The computer readable storage medium stores one or more programs. When the one or more programs are executed by an electronic device that includes a plurality of application programs, the electronic device can perform the method for verifying certificates and the method for verifying identities provided in Implementations 1 and 2.

Specific implementations of the present application are described above. Other implementations fall within the scope of the appended claims. In some situations, the actions or steps described in the claims can be performed in an order different from the order in the implementations and the desired results can still be achieved. In addition, the process shown in the accompanying drawings does not necessarily require a particular execution order to achieve the desired results. In some implementations, multi-tasking and parallel processing can be advantageous.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 7:
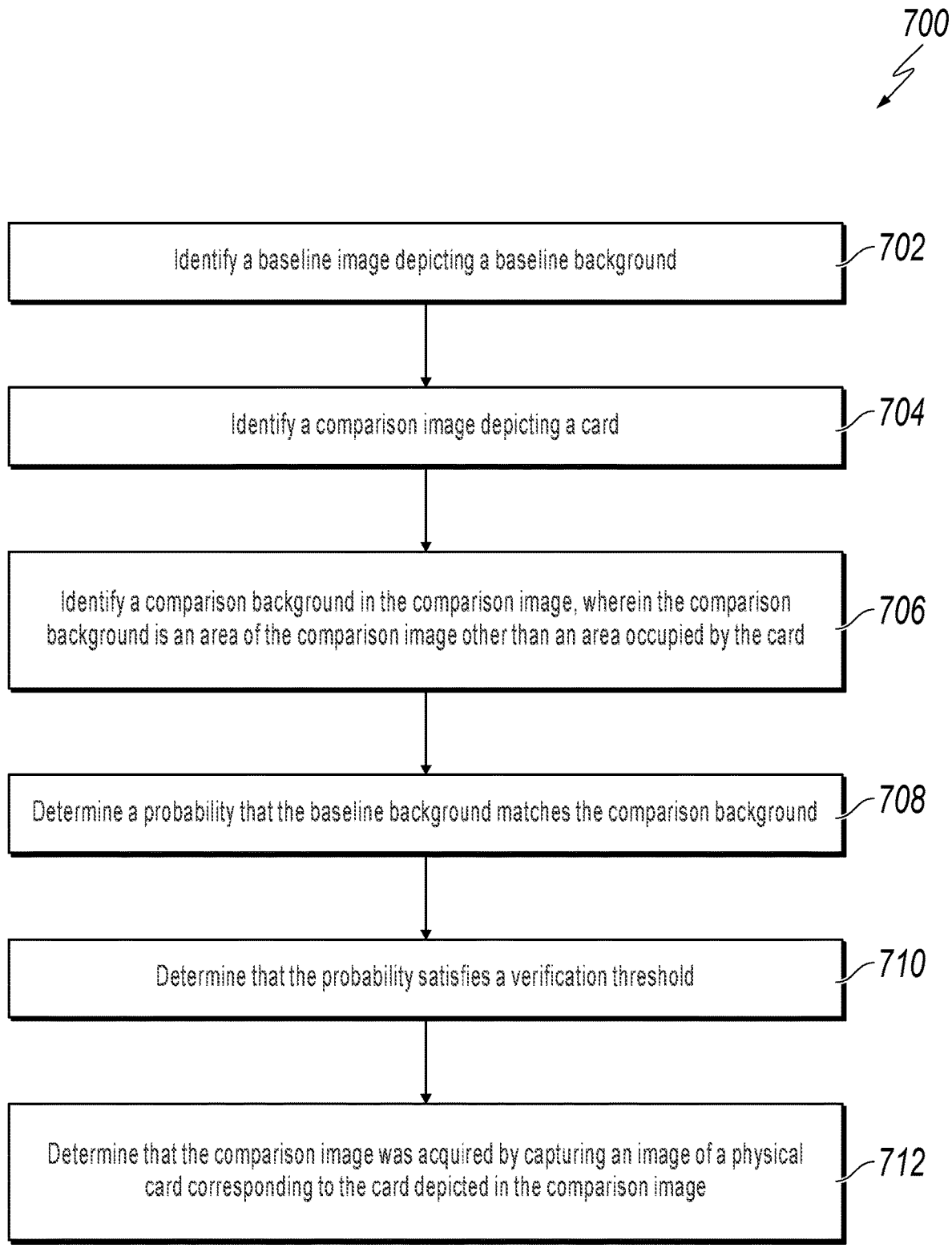
FIG. 7 is a flowchart illustrating an example of a computer-implemented method for verifying authenticity of an image, according to an implementation of the present disclosure.

FIG. 7 is a flowchart illustrating an example of a computer-implemented method 700 for verifying authenticity of an image, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a baseline image depicting a baseline background is identified. At 704, a comparison image depicting a card is identified. At 706, a comparison background in the comparison image is identified, wherein the comparison background is an area of the comparison image other than an area occupied by the card.

At 708, a probability that the baseline background matches the comparison background is determined. At 710, a determination is made that the probability satisfies a verification threshold. In some cases, determining that the probability of the baseline background matching the comparison background satisfies the verification threshold includes receiving a set of baseline positions associated with the baseline image and determined based on a gyroscope; receiving a set of comparison positions associated with the comparison image and determined based on the gyroscope; identifying a set of common positions including an intersection of the set of baseline positions and the set of comparison positions; identifying a baseline area of the baseline background corresponding to the set of common positions and a comparison area of the comparison background corresponding to the set of common positions; and wherein the probability is determined based at least in part on the baseline area matching the comparison area.

At 712, in response to determining that the probability satisfies a verification threshold, a determination is made that the comparison image was acquired by capturing an image of a physical card corresponding to the card depicted in the comparison image. In some cases, the physical card is an identity card including at least one of a head shot or a text associated with a card holder. In some examples, the physical card includes a head shot, and the method further comprises identifying a comparison head shot in the comparison image; verifying that the comparison head shot matches the head shot on the physical card; and in response to verifying that the comparison head shot matches the head shot on the physical card, determining that an identity of the card holder is verified. In some implementations, the physical card includes text associated with the card holder, and the method further comprises identifying a comparison text in the comparison image; verifying that the comparison text matches the text on the physical card; and in response to verifying that the comparison text matches the text on the physical card, determining that an identity of the card holder is verified. In some cases, the physical card has an anti-counterfeit mark, and the method further comprises identifying the anti-counterfeit mark in the comparison image of the physical card; inputting the anti-counterfeit mark to a classification model, wherein the classification model outputs a probability of the anti-counterfeit mark being authentic; and in response to determining that the probability of the anti-counterfeit mark being authentic satisfies a verification threshold, determining that the physical card is verified.

In some cases, the baseline image depicts a baseline card, the card depicted by the comparison image is a comparison card, the baseline image is acquired using a baseline camera setting, the comparison image is acquired using a comparison camera setting, and the method further comprises identifying a differentiation between the baseline card and the comparison card; and inputting the differentiation to a classification model, wherein the classification model outputs an authenticity verification of the physical card. In some implementations, the baseline camera setting includes turning a flashlight on and the comparison camera setting includes turning the flashlight off.

The techniques described herein can produce one or more technical effects. For example, the techniques can enable a service provider to verify whether a particular user using the service provides an image of an identity card's original copy. This verification can enable the provider to prevent users from providing fraudulent identity information in order to use the service without being verified the identity of the user. This can provide additional security for the service provider against misuse or fraudulent use of the service. The techniques can also enable a service provider to determine whether an image depicts a physical card or a reproduction of a physical card (e.g., a photocopy or other printed image). Each image of the physical card will exhibit certain correspondence with other images depicting the same physical card, while images of a reproduction of the physical card will not exhibit such correspondence.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for verifying authenticity of an image, comprising:
   identifying a baseline image depicting a baseline background, wherein the baseline background is an area of the baseline image other than an area occupied by a card;
   identifying a comparison image depicting the card;
   identifying a comparison background in the comparison image, wherein the comparison background is an area of the comparison image other than an area occupied by the card;
   determining a probability that the baseline background matches the comparison background;
   determining that the probability satisfies a verification threshold; and
   in response to determining that the probability satisfies a verification threshold, determining that the comparison image was acquired by capturing an image of a physical card corresponding to the card depicted in the comparison image.

2. The computer-implemented method of claim 1, wherein the baseline image depicts a baseline card, the card depicted by the comparison image is a comparison card, the baseline image is acquired using a baseline camera setting, the comparison image is acquired using a comparison camera setting, and the method further comprising:
   identifying a differentiation between the baseline card and the comparison card; and
   inputting the differentiation to a classification model, wherein the classification model outputs an authenticity verification of the physical card.

3. The computer-implemented method of claim 2, wherein the baseline camera setting includes turning a flashlight on and the comparison camera setting includes turning the flashlight off.

4. The computer-implemented method of claim 1, wherein the physical card is an identity card including at least one of a head shot or a text associated with a card holder.

5. The computer-implemented method of claim 4, wherein the physical card includes a head shot, and the method further comprises:
   identifying a comparison head shot in the comparison image;
   verifying that the comparison head shot matches the head shot on the physical card; and
   in response to verifying that the comparison head shot matches the head shot on the physical card, determining that an identity of the card holder is verified.

6. The computer-implemented method of claim 4, wherein the physical card includes text associated with the card holder, and the method further comprises:
   identifying a comparison text in the comparison image;
   verifying that the comparison text matches the text on the physical card; and
   in response to verifying that the comparison text matches the text on the physical card, determining that an identity of the card holder is verified.

7. The computer-implemented method of claim 1, wherein determining that the probability of the baseline background matching the comparison background satisfies the verification threshold includes:
   receiving a set of baseline positions associated with the baseline image and determined based on a gyroscope;
   receiving a set of comparison positions associated with the comparison image and determined based on the gyroscope;
   identifying a set of common positions including an intersection of the set of baseline positions and the set of comparison positions;
   identifying a baseline area of the baseline background corresponding to the set of common positions and a comparison area of the comparison background corresponding to the set of common positions; and
   wherein the probability is determined based at least in part on the baseline area matching the comparison area.

8. The computer-implemented method of claim 1, wherein the physical card has an anti-counterfeit mark, and the method further comprising:
   identifying the anti-counterfeit mark in the comparison image of the physical card;
   inputting the anti-counterfeit mark to a classification model, wherein the classification model outputs a probability of the anti-counterfeit mark being authentic; and in response to determining that the probability of the anti-counterfeit mark being authentic satisfies a verification threshold, determining that the physical card is verified.

9. A non-transitory, computer-readable medium storing one or more instructions executable by a computer system to perform operations comprising:
   identifying a baseline image depicting a baseline background, wherein the baseline background is an area of the baseline image other than an area occupied by a card;
   identifying a comparison image depicting the card;
   identifying a comparison background in the comparison image, wherein the comparison background is an area of the comparison image other than an area occupied by the card;
   determining a probability that the baseline background matches the comparison background;
   determining that the probability satisfies a verification threshold; and
   in response to determining that the probability satisfies a verification threshold, determining that the comparison image was acquired by capturing an image of a physical card corresponding to the card depicted in the comparison image.

10. The non-transitory, computer-readable medium of claim 9, wherein the baseline image depicts a baseline card, the card depicted by the comparison image is a comparison card, the baseline image is acquired using a baseline camera setting, the comparison image is acquired using a comparison camera setting, and the operations further comprising:
    identifying a differentiation between the baseline card and the comparison card; and
    inputting the differentiation to a classification model, wherein the classification model outputs an authenticity verification of the physical card.

11. The non-transitory, computer-readable medium of claim 10, wherein the baseline camera setting includes turning a flashlight on and the comparison camera setting includes turning the flashlight off.

12. The non-transitory, computer-readable medium of claim 9, wherein the physical card is an identity card including at least one of a head shot or a text associated with a card holder.

13. The non-transitory, computer-readable medium of claim 12, wherein the physical card includes a head shot, and the operations further comprises:
    identifying a comparison head shot in the comparison image;
    verifying that the comparison head shot matches the head shot on the physical card; and
    in response to verifying that the comparison head shot matches the head shot on the physical card, determining that an identity of the card holder is verified.

14. The non-transitory, computer-readable medium of claim 12, wherein the physical card includes text associated with the card holder, and the operations further comprises:
    identifying a comparison text in the comparison image;
    verifying that the comparison text matches the text on the physical card; and
    in response to verifying that the comparison text matches the text on the physical card, determining that an identity of the card holder is verified.

15. The non-transitory, computer-readable medium of claim 9, wherein determining that the probability of the baseline background matching the comparison background satisfies the verification threshold includes:
    receiving a set of baseline positions associated with the baseline image and determined based on a gyroscope;
    receiving a set of comparison positions associated with the comparison image and determined based on the gyroscope;
    identifying a set of common positions including an intersection of the set of baseline positions and the set of comparison positions;
    identifying a baseline area of the baseline background corresponding to the set of common positions and a comparison area of the comparison background corresponding to the set of common positions; and
    wherein the probability is determined based at least in part on the baseline area matching the comparison area.

16. The non-transitory, computer-readable medium of claim 9, wherein the physical card has an anti-counterfeit mark, and the operations further comprising:
    identifying the anti-counterfeit mark in the comparison image of the physical card;
    inputting the anti-counterfeit mark to a classification model, wherein the classification model outputs a probability of the anti-counterfeit mark being authentic; and
    in response to determining that the probability of the anti-counterfeit mark being authentic satisfies a verification threshold, determining that the physical card is verified.

17. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       identifying a baseline image depicting a baseline background, wherein the baseline background is an area of the baseline image other than an area occupied by a card;
       identifying a comparison image depicting the card;
       identifying a comparison background in the comparison image, wherein the comparison background is an area of the comparison image other than an area occupied by the card;
       determining a probability that the baseline background matches the comparison background;
       determining that the probability satisfies a verification threshold; and
       in response to determining that the probability satisfies a verification threshold, determining that the comparison image was acquired by capturing an image of a physical card corresponding to the card depicted in the comparison image.

18. The system of claim 17, wherein the baseline image depicts a baseline card, the card depicted by the comparison image is a comparison card, the baseline image is acquired using a baseline camera setting, the comparison image is acquired using a comparison camera setting, and the operations further comprising:
    identifying a differentiation between the baseline card and the comparison card; and
    inputting the differentiation to a classification model, wherein the classification model outputs an authenticity verification of the physical card.

19. The system of claim 18, wherein the baseline camera setting includes turning a flashlight on and the comparison camera setting includes turning the flashlight off.

20. The system of claim 17, wherein the physical card is an identity card including at least one of a head shot or a text associated with a card holder.

* * * * *